United States Patent
Kodera et al.

(10) Patent No.: US 7,255,405 B2
(45) Date of Patent: Aug. 14, 2007

(54) CUSHION FOR SEAT

(75) Inventors: Tokio Kodera, Tochigi (JP); Takahito Yabe, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 196 days.

(21) Appl. No.: 11/083,234

(22) Filed: Mar. 17, 2005

(65) Prior Publication Data

US 2005/0212344 A1    Sep. 29, 2005

(30) Foreign Application Priority Data

Mar. 18, 2004    (JP)    ............................. 2004-078073

(51) Int. Cl.
*A47C 7/02*    (2006.01)
(52) U.S. Cl. ........................... 297/452.62; 297/452.58; 297/452.61
(58) Field of Classification Search ............. 297/218.2, 297/218.5, 452.38, 452.58, 452.61, 452.62
See application file for complete search history.

(56) References Cited

U.S. PATENT DOCUMENTS

| | | | | |
|---|---|---|---|---|
| 4,047,756 | A | * | 9/1977 | Ney .......................... 297/219.1 |
| 4,844,539 | A | * | 7/1989 | Selbert .................. 297/228.13 |
| 5,615,928 | A | * | 4/1997 | Penley ................... 297/452.56 |
| 5,820,213 | A | * | 10/1998 | Severinski ............... 297/218.5 |
| 6,079,779 | A | * | 6/2000 | Tanaka et al. ......... 297/228.13 |
| D463,704 | S | * | 10/2002 | Hoffman, Jr. ................ D6/611 |
| 6,612,648 | B1 | * | 9/2003 | Hashiguchi .............. 297/218.1 |

* cited by examiner

*Primary Examiner*—Laurie K. Cranmer
(74) *Attorney, Agent, or Firm*—Dann, Dorfman, Herrell and Skillman, P.C.

(57) ABSTRACT

A cushion for a seat, including a foam padding integral with a three-dimensional cover covering the padding, the three-dimensional cover including a first piece, a second piece spaced apart from the first piece and facing the first piece, the second piece having first and second spaced apart sections, and a connecting section adjacent one ends of the first and second sections and interconnecting the first and second spaced apart sections, a peripheral piece disposed between the first and second pieces, extending along peripheral edges of the first and second pieces except an edge of one side of each of the first and second pieces, and attached at edges thereof to the peripheral edges of the first and second pieces, an intermediate piece attached at an edge of one side thereof to an edge of the connecting section of the second piece between the first and second sections so as to be disposed between the first and second sections, a third piece attached at an edge of one side thereof to the edge of the side of the first piece, slide fastener devices attached to edges of both free sides of the intermediate piece and inner side edges of the first and second sections for coupling and uncoupling the intermediate piece to the first and second sections of the second piece, the padding being integrated with pieces of the cover except the intermediate piece and the third piece, a first engaging device attached to a free end of the third piece, a second engaging device attached to a free end of the intermediate piece, and third engaging devices attached to free ends of the first and second sections of the second piece.

8 Claims, 4 Drawing Sheets

CUSHION FOR SEAT

BACKGROUND OF THE INVENTION

1. Field of the Invention

This invention relates to a cushion for a seat and, more particularly, to a cushion in which a foam padding is integrated with a three-dimensional cover covering the foam padding.

2. Description of the Prior Art

Generally, a cushion for a seat back of a vehicle seat in which a foam padding is integrated with a three-dimensional cover covering the padding is formed by a die apparatus. When the cushion is to be formed by the die apparatus, the three-dimensional cover is laid in the die apparatus. In this condition, expandable resin is poured into an interior of the three-dimensional cover through the die apparatus and allowed to foam, whereby a padding of the foaming resin integral with the cover is formed. In this way, a finished cushion is formed. After the finished cushion is formed and removed from the die apparatus, a seat back frame for supporting the cushion is incorporated in the padding. For this purpose, the die apparatus includes a core for forming a cavity opened at a rear side of the padding for receiving the seat back frame. When the three-dimensional cover is laid in the die apparatus, the core is inserted in the three-dimensional cover. In order that the three-dimensional cover can receive the core when it is laid in the die apparatus, there has been proposed a three-dimensional cover, a rear side section of which is adapted to be openable and closable with respect to the cover by slide fastener means. Japanese Utility Model Publication No. 46894/1993 discloses such a three-dimensional cover.

The conventional cover is formed into a bag form and inevitably opened at a lower portion thereof in order to facilitate combining of a finished cushion with the seat back frame. When forming of a cushion is to be carried employing the cover, the cover is laid in the die apparatus with the rear side section thereof being opened by the slide fastener means and with an interior thereof receiving the core through the opened rear side section. The conventional cover is designed so as to be opened at the rear side section thereof by the slide fastener means as discussed above, so that the three-dimensional cover can easily receive the core through the opened rear side section. After the finished cushion in which the cover is integrated with the padding is formed by the die apparatus and removed from the die apparatus, the seat back frame is incorporated into a cavity of the padding which is formed by the core. The rear side section of the cover is then closed by the slide fastener means.

The lower section of the conventional cover integrated with the padding is inevitably opened as discussed above and a lower portion of the padding is exposed to the outside through the opened lower section of the cover, so that it is necessary to close the lower section of the cover so as to conceal the lower portion of the padding after the seat back frame is incorporated into the cavity of the padding. However, the closing of the lower section of the cover will take a lot of labor. In addition, it is hard to close the lower section of the cover so that the cushion has a good visual appearance.

SUMMARY OF THE INVENTION

The present invention has been made with a view to overcoming the foregoing problems of the prior art cushion.

It is an object of this invention to provide a cushion for a seat, in which a foam padding is integrated with a three-dimensional cover inevitably opened at a part thereof and the opened part of the three-dimensional cover can be easily closed.

It is another object of the present invention to provide a cushion for a seat which has a good visual appearance.

In accordance with the present invention, there is provided a cushion for a seat which comprises a foam padding integral with a three-dimensional cover covering the foam padding. The three-dimensional cover comprises a first piece, a second piece spaced apart from the first piece and facing the first piece, the second piece comprising first and second spaced apart sections, and a connecting section adjacent one ends of the first and second sections and interconnecting the first and second spaced apart sections, a peripheral piece disposed between the first and second pieces, extending along peripheral edges of the first and second pieces except an edge of one side of each of the first and second pieces, and attached at edges thereof to the peripheral edges of the first and second pieces, an intermediate piece attached at an edge of one side thereof to an edge of the connecting section of the second piece between the first and second sections so as to be disposed between the first and second sections, a third piece attached at an edge of one side thereof to the edge of the side of the first piece, slide fastener means attached to edges of both free sides of the intermediate piece and inner side edges of the first and second sections for coupling and uncoupling the intermediate piece to the first and second sections of the second piece, the padding being integrated with pieces of the cover except the intermediate piece and the third piece, first engaging means attached to a free end of the third piece, second engaging means attached to a free end of the intermediate piece, and third engaging means attached to free ends of the first and second sections of the second piece. The intermediate piece is coupled to the first and second sections of the second piece by the slide fastener means, the second engaging means of the intermediate piece is aligned with the third engaging means of the first and second sections of the second piece, the third piece is extended from the first piece toward the second piece so as to be wrapped around a portion of the padding, and the first engaging means of the third piece is releasably engaged with the second engaging means of the intermediate piece and the third engaging means of the first and second sections of the second piece, so that the padding can be easily covered on all sides with the cover.

The padding may have a cavity for receiving a support frame for supporting the cushion. The cavity is opened at a side of the padding which faces the second piece of the cover.

The first engaging means may comprise a plate-shaped fastener, and each of the second and third engaging means may comprise a fastener of a substantially J-shape in cross-section.

The seat may comprise a vehicle seat, a seat for an aircraft or a seat for furniture.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE INVENTION

Figure 1:
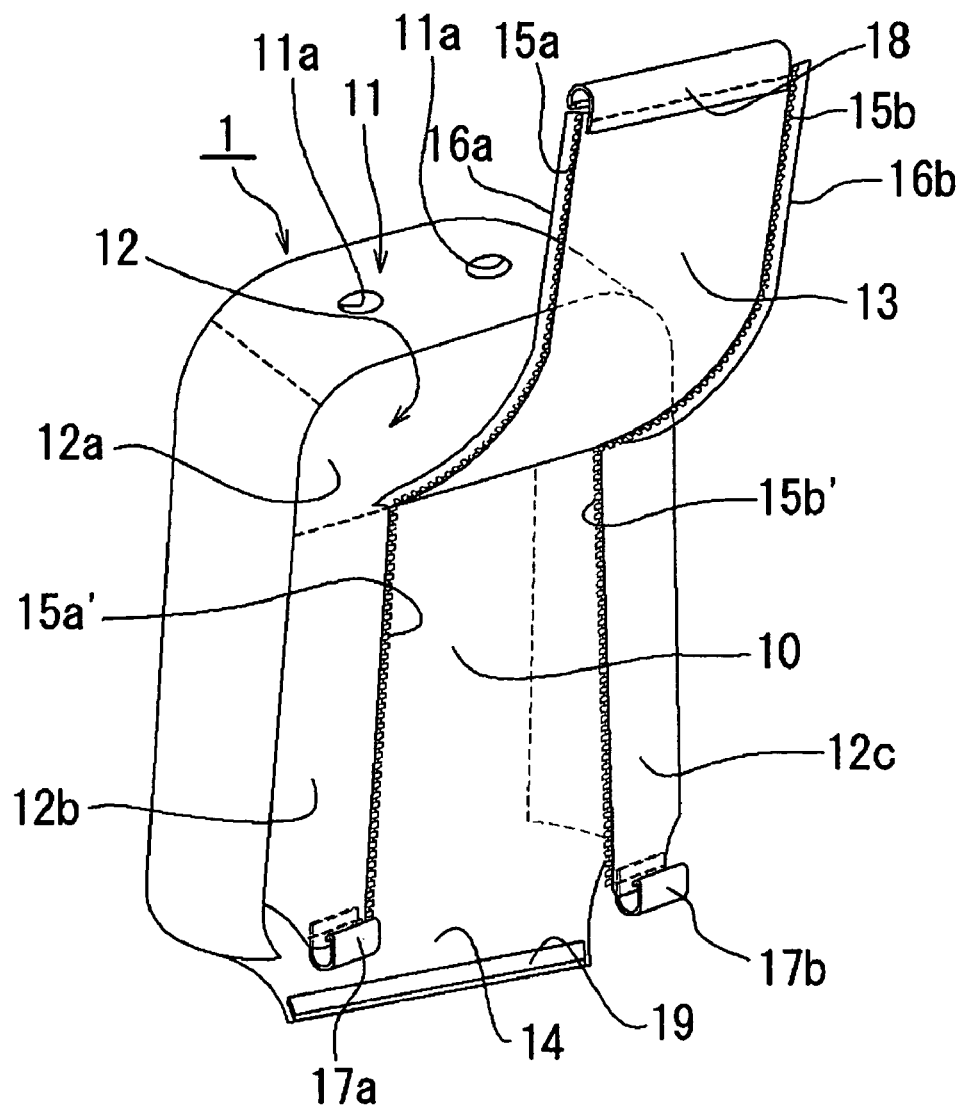
FIG. 1 is a perspective view showing a cover for a cushion according to the present invention.

Referring to FIG. 1, there is illustrated a three-dimensional cover 1 for a cushion according to the present invention, for example, a cushion for a seat back of a vehicle seat, in which a foam padding is integrated with the three-dimensional cover 1. The three-dimensional cover 1 is formed by causing several pieces of fabric, synthetic leather or the like to be attached together by, for example, sewing. More particularly, the three-dimensional cover 1 comprises a front side piece 10 of a predetermined shape, a rear side piece 12 spaced apart from the front side piece 10 and opposed to the front side piece 10, a peripheral piece 11 disposed between the front side piece 10 and the rear side piece 12, extending along peripheral edges of the front side and rear side pieces 10, 12 except lower edges of the front side and rear side pieces 10, 12, and attached to the peripheral edges of the front side and rear side pieces 10, 12 at edges of the peripheral piece 11, and a lower side piece 14 attached at an edge thereof to a lower edge of the front side piece 10. A top section of the peripheral piece 11 is formed with a pair of spaced apart through-holes 11a through which stays of a head rest are to be inserted. The rear side piece 12 comprises a pair of spaced apart side sections 12b, 12c, and an upper section 12a connected to upper edges of the spaced apart side sections 12b, 12c and interconnecting the spaced apart side sections 12b, 12c. The rear side piece 12 further includes an intermediate piece 13 having a width substantially corresponding in size to a space between the spaced apart side sections 12b, 12c. The intermediate piece 13 is attached at an upper edge thereof to a lower edge of the upper section 12a of the rear side piece 12, and is to be disposed between the spaced apart side sections 12b, 12c.

The cover 1 further includes two pairs of zipper strips 15a, 15a', 15b, 15b' and two slider assemblies (not shown). More particularly, a first zipper strip 15a is attached to and substantially coextensive with an edge of one of both sides of the intermediate piece 13. A second zipper strip 15a' is attached to and substantially coextensive with an inside edge of the side section 12b of the rear side piece 12. A first slider assembly (not shown), supported by the first zipper strip 15a and the second zipper strip 15a', is included for zipping and unzipping the first zipper strip 15a with respect to the second zipper strip 15a'. Also, a third zipper strip 15b is attached to and substantially coextensive with an edge of the other of the both sides of the intermediate piece 13. A fourth zipper strip 15b' is attached to and substantially coextensive with an inside edge of the side section 12c of the rear side piece 12. A second slider assembly (not shown), supported by the third zipper 15b and the fourth zipper strip 15b', is included for zipping and unzipping the third zipper strip 15b with respect to the fourth zipper strip 15b'. The first slider assembly is moved to the beginning of the second zipper strip 15a'. The beginning of the first zipper strip 15a is inserted into the first slider assembly. The first slider assembly is slid along the entire edge to the ends of the first zipper strip 15a and the second zipper strip 15a'. Similarly, the second slider assembly is moved to the beginning of the fourth zipper strip 15b'. The beginning of the third zipper strip 15b is inserted into the second slider assembly. The second slider assembly is slid along the entire edge to the ends of the third zipper strip 15b and the fourth zipper strip 15b'. In these ways, the intermediate piece 13 is operatively connected to the side sections 12b, 12c of the rear side piece 12. To separate the intermediate piece 13 from the side sections 12b, 12c of the rear side piece 12, the first and second slider assemblies are moved in the opposite directions to unzip the first and third zipper strips 15a, 15b from the second and fourth zipper strips 15a', 15b'. As the first and second slider assemblies, there may be employed any suitable conventional slider assemblies.

Attached to and substantially coextensive with the entire both side edges of the intermediate piece 13 are covering strips 16a, 16b for concealing the zipper strips 15a, 15a', 15b, 15b' when the intermediate piece 13 is operatively connected to the side sections 12b, 12c of the rear side piece 12. The covering strips 16a, 16b may be attached to the inside edges of the side sections 12b, 12c of the rear side piece 12 so as to be substantially coextensive with the inside edges of the side sections 12b, 12c.

The intermediate piece 13 has an engaging fastener 18 of a substantially J-shape in cross-section attached to a lower edge thereof. The first side section 12b of the rear side piece 12 has an engaging fastener 17a of a substantially J-shape in cross-section attached to a lower edge thereof. Similarly, the second side section 12c of the rear side piece 12 has an engaging fastener 17b of a substantially J-shape in cross-section attached to a lower edge thereof. The lower side piece 14 has an engaging fastener 19 of a plate shape attached to an edge of a free end thereof. Each of the engaging fasteners may be formed from a trim cord.

Figure 2:
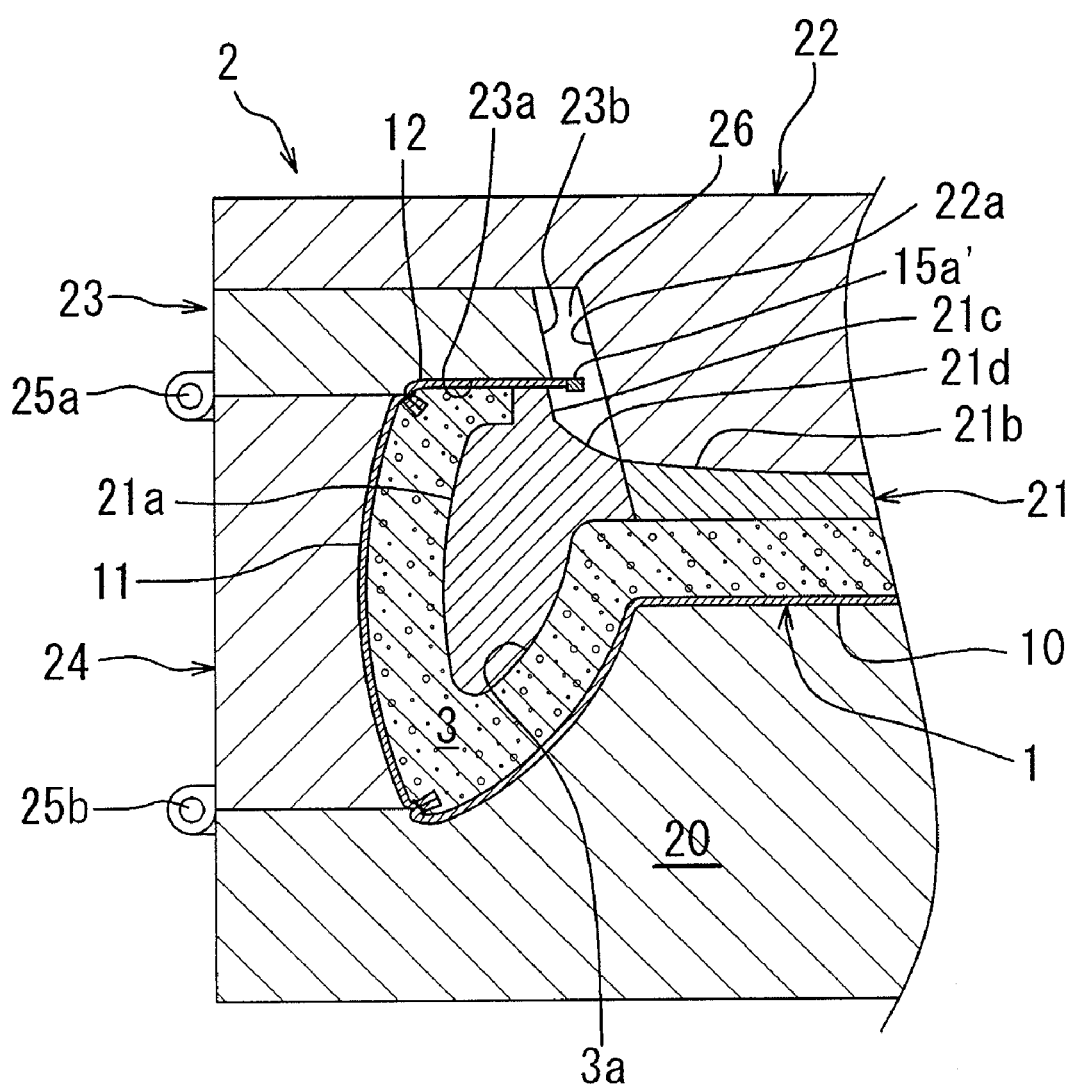
FIG. 2 is a sectional view showing a die apparatus for forming the cushion, in which the cover is shown in cross-section.
Figure 3:
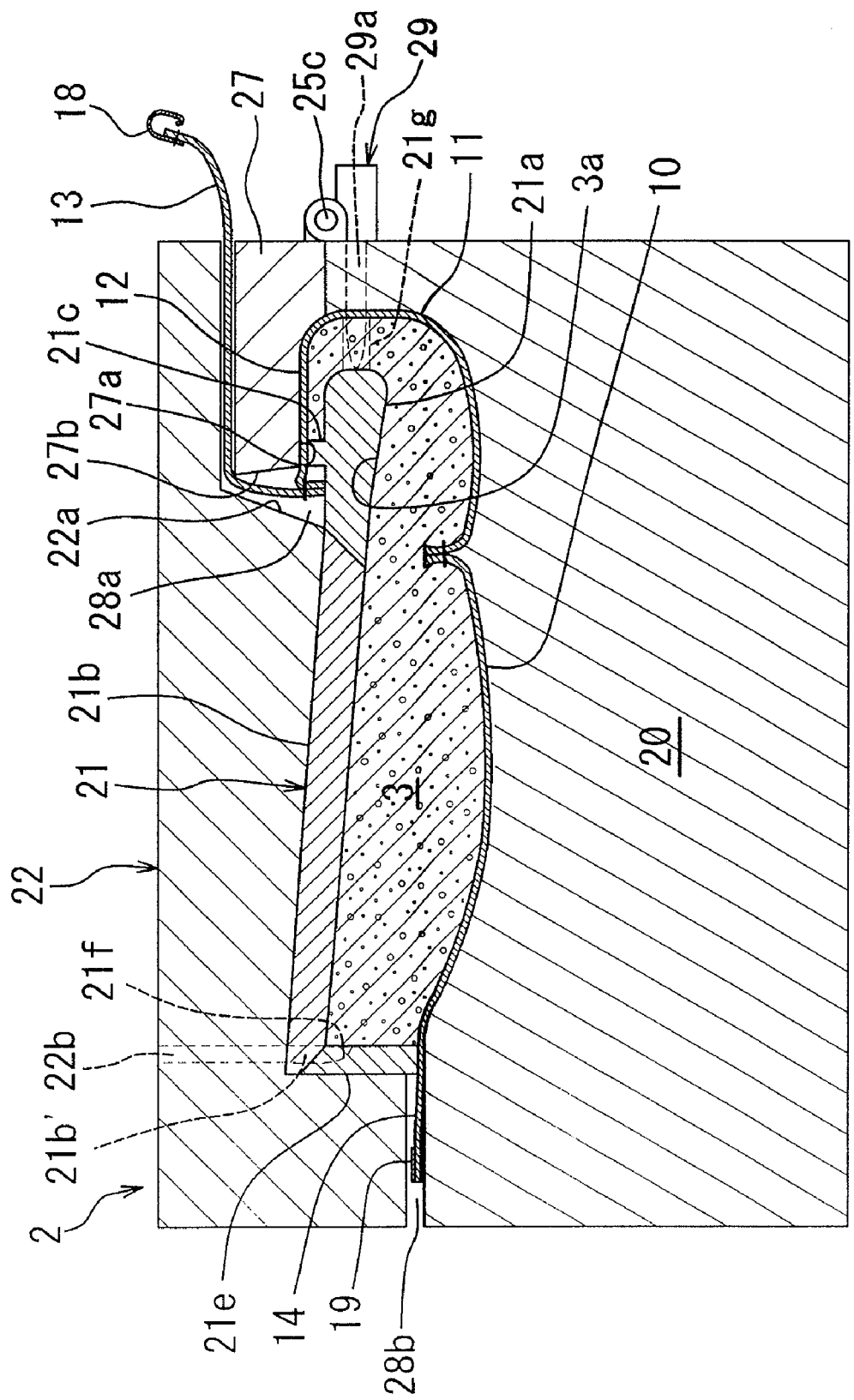
FIG. 3 is a sectional view showing the die apparatus of FIG. 2, in which the cover is shown in vertical-section.

Referring to FIGS. 2 and 3, there is illustrated a die apparatus 2 for forming the cushion of the seat back for the vehicle seat, in which a foam padding 3 is integrated with the respective pieces of the cover 1 except the intermediate piece 13 and the lower side piece 14. The foam padding 3 integral with the cover 1 is made of any suitable expandable resin by the die apparatus 2. The die apparatus 2 comprises a first die means 20 for forming front and rear sections and a peripheral section of the cushion, a core 21 for forming a cavity 3a opened at a rear side of the foam padding 3 for receiving a seat back frame (not shown), and a second die means 22 adapted to be combined with the first die means 20 and clamped against the first die means 20 when the cushion is to be formed by the die apparatus. The cover 1 is laid on the first die means 20.

Incidentally, while FIG. 2 shows only half of the die apparatus 2, the die apparatus 2 has a geometric symmetry structure. In the event that an air-permeable cover is employed as the cover 1, the first die means 20 on which the cover 1 is to be laid preferably has air-ventilating holes (not shown). In this case, a vacuum pump means (not shown) for providing a vacuum is coupled to the air-ventilating holes through paths. When the vacuum is applied to the first die means 20 by the vacuum pump means, the vacuum is applied through the air-ventilating holes to the cover 1 on the first die means 20, to thereby cause the cover 1 to be drawn onto and set on the first die means 20.

As shown in FIG. 2, the first die means 20 is provided with a first sectional die means 23 for forming the rear side section of the cushion, and a second sectional die means 24 for forming the peripheral section of the cushion. The first sectional die means 23 is coupled to the second sectional die means 24 by a first hinge means 25a. The second sectional die means 24 is coupled to the first die means 20 by a second hinge means 25b. Thus, the first and second sectional die means 23, 24 can be opened and closed with respect to the first die means 20 by the first and second hinge means 25a, 25b.

When the die apparatus 2 is to form the cushion, the first sectional die means 23 is adapted to be contacted with the rear side piece 12 of the cover 1 (laid on the first die means 20) at a die surface 23a thereof. The first sectional die means 23 has an inner slant surface 23b which is to face a slant surface 22a of the second die means 22.

The core 21 comprises a first section 21a and a second section 21b which are dividable. The first section 21a of the core 21 is provided with a protrusion 21c which is to face the die surface 23a of the first sectional die means 23, and a slant surface 21d which extends from the protrusion 21c and is to face the slant surface 22a of the second die means 22. When the die apparatus 2 is to form the cushion, the side sections 12b, 12c (see FIG. 1) of the rear side piece 12 of the cover 1 are interposed between the die surface 23a of the first sectional die means 23 and the protrusion 21c of the core 21 with the second and fourth zipper strips-attached terminals of the side sections 12b, 12c of the rear side piece 12 being received within a first space 26 which is defined by the inner slant surface 23b of the first sectional die mean 23, the slant surface 22a of the second die means 22, the slant surface 21d of the first section 21a of the core 21, and the protrusion 21c of the first section 21a of the core 21.

As shown in FIG. 3, the first die means 20 is further provided with a third sectional die means 27 which is to be contacted with the upper section 12a (see FIG. 1) of the rear side piece 12 of the cover 1. The third sectional die means 27 is coupled to the first die means 20 by a third hinge means 25c so as to be openable and closable with respect to the first die means 20. The third sectional die means 27 has a planar surface 27a which is to face the protrusion 21c of the first section 21a of the core 21, and an inner surface 27b which is to face the slant surface 22a of the second die means 22. The upper section 12a of the rear side piece 12 is interposed between the planar surface 27a of the third sectional die means 27 and the protrusion 21c of the first section 21a of the core 21.

The second die means 22 has a pouring hole 22b for allowing expandable resin to be poured into the die apparatus 2 therethrough. Arranged tangentially with an end of the second section 21b of the core 21 is a hold-down sectional die means 21e of a plate-shape for holding against the first die 20 a boundary between the lower side piece 14 and the front side piece 10 of the cover 1. The hold-down sectional die means 21e has a notch 21f for allowing the expandable resin from the pouring hole 22b of the second die means 22 to flow into the cover 1. The notch 21f of the hold-down sectional die means 21e communicates with the pouring hole 22b of the second die means 22 through a hole 21b' formed in the second section 21b of the core 21. Two pipes 21g (only one pipe 21g is shown in FIG. 3) for forming through-holes in the padding 3 for receiving the stays of the head rest are arranged in close proximity to the first section 21a of the core 21 and aligned with the through-holes 11a (see FIG. 1) of the cover 1.

A second space 28a is defined between the second die means 22 and the third sectional die means 27. The second space 28a serves as means to allow the intermediate piece 13 of the cover 1 to be drawn out of the die apparatus 2. Further, a third space 28b is defined between the second die means 22 and the first die means 20. The third space 28b serves as means to receive the lower piece 14 of the cover 1.

The die apparatus is further provided with two cylinders 29 having positioning rods 29a which are adapted to operatively penetrate the through-holes 11a (see FIG. 1) of the cover 1 and fit into the pipes 21g (only one cylinder 29 is shown in FIG. 3).

Again referring to FIGS. 1 to 3, the forming of the cushion which is performed utilizing the die apparatus of FIGS. 2 and 3 will be discussed hereinafter.

In a condition where the second die means 22 is removed from the first die means 20 and the first, second and third sectional die means 23, 24, 27 are opened with respect to the first die means 20 by the hinge means 25a, 25b, 25c, the cover 1 is laid on a die surface of the first die means 20 with the intermediate piece 13 being separated from the side sections 12b, 12c of the rear side piece 12 of the cover 1 by unzipping the first and third zipper strips 15a, 15b of the intermediate piece 13 from the second and fourth zipper strips 15a', 15b' of the both sides 12b, 12c of the rear side piece 12.

In a condition where the cover is set on the die surface of the first die means 20, the hold-down sectional die means 21e is combined with the first die so as to be put on the boundary between the front side piece 10 and the lower side piece 14 against the first die means 20, the core 21 is inserted in the three-dimensional cover 1, the pipes 21g are arranged between the first section 21a of the core 21 and the upper section of the intermediate piece 11 of the cover 1, and the positioning rods 29a of the cylinders 29 are operatively fitted into the pipes 21g. Thereafter, the first, second and third sectional die means 23, 24, 27 are closed with respect to the first die means 20 and clamped against the first die means 20. The second die means 22 is then combined with the first die means 20 and clamped against the first die means 20 in a condition where the second and fourth zipper strips-attached terminals of the side sections 12b, 12c of the rear side piece 12 of the cover 1 are received within the first space 26, the intermediate piece 13 of the cover 1 is drawn out of the die apparatus 2 through the second space 28a, and the lower piece 14 of the cover 1 is received within the third space 28b. In this condition, the expandable resin is poured into the interior of the cover 1 through the pouring hole 22b of the second die means 22, the hole 21b' of the core 21 and the notch 21f of the hold-down sectional die means 21e, and foams in the interior of the cover 1, whereby a cushion in which the padding 3 of the foamed resin is integrated with the cover 1 and formed with the cavity 3a for receiving the seat back frame is formed.

Incidentally, in the event that a cover which is laminated with a layer of a foam slab having a thickness of about 3-4 mm is employed as the cover 1, the die apparatus 2 is preferably designed so that a clearance of about 2.5-3 mm is provided between the die surface 23a of the first sectional die means 23 and the protrusion 21c of the core 21, between the die surface 27a of the third sectional die means 27 and the protrusion 21c of the core 21, and between the hold-down sectional die 21e and the die surface of the first die means 20.

In the die apparatus 2, the rear side piece 12 of the cover 1 is interposed between the die surfaces 23a, 27a of the first and third sectional die means 23, 27 and the protrusion 21c of the core 21, and the boundary between the front side piece 10 and the lower side piece 14 is interposed between the die surface of the first die means 20 and the hold-down sectional die means 21e. Therefore, a portion of the foaming resin is prevented from being impregnated into the intermediate piece 13 and lower side piece 14 of the cover 1. Thus, the finished cushion which exhibits an appropriate cushioning property and a good touch feeling property can be obtained.

After the expandable resin which is poured into the interior of the cover foams and is integrated with the cover 1 as the padding 3, the second die means 22 is removed from the first die means 20, the first sectional die means 23 is opened with respect to the second sectional die means 24 by the first hinge means 25a, the second sectional die means 24 is opened with respect to the first die means 20 by the second hinge means 25b, and the third die means 27 is opened with respect to the first die means 20. In this condition, the finished cushion in which the padding 3 is integral with the cover 1 can be removed from the first die means 20.

Figure 4:
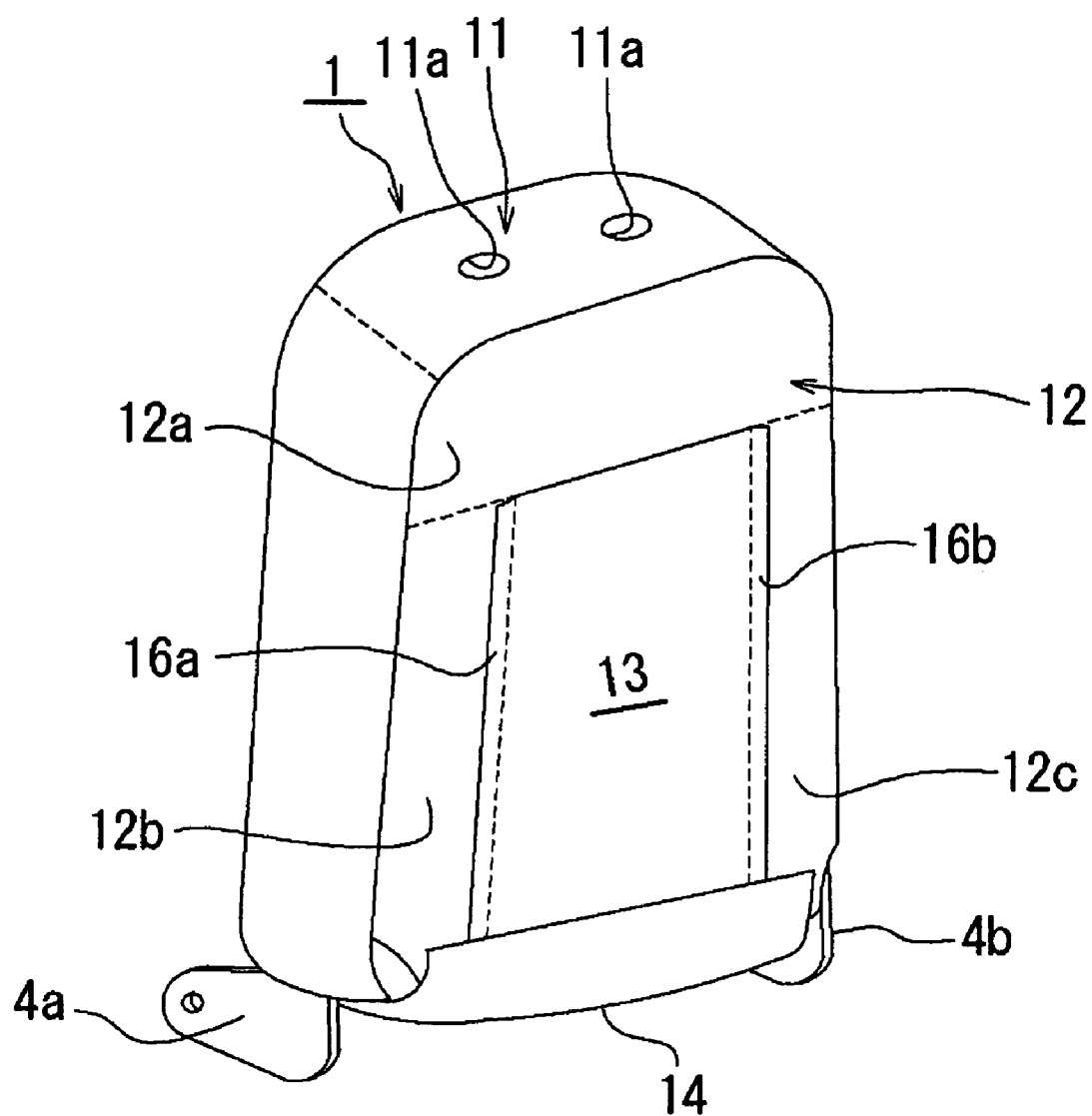
FIG. 4 is a perspective view of a finished cushion as viewed from the rear side.

Referring now FIG. 4, there is illustrated the finished cushion formed by the die apparatus 2 of FIGS. 2 and 3. A seat back frame (not shown) is incorporated into the cavity of the padding of the cushion with side brackets 4a, 4b thereof projecting out of the cover 1. The intermediate piece 13 is then coupled to the side sections 12b, 12c of the rear side piece 12 by zipping the first and third zipper strips 15a, 15b with respect to the second and fourth zipper strips 15a', 15b', to thereby conceal an opening between the side sections 12b, 12c of the rear side piece 12 with the intermediate piece 13. Thereafter, the substantially J-shaped fastener 18 (see FIG. 1) attached at the lower edge of the intermediate piece 13 is aligned with the substantially J-shaped fasteners 17a, 17b attached to the lower edges of the side sections 12b, 12c of the rear side piece 12, the lower side piece 14 of the cover 1 is extended from the lower edge of the front side piece 10 toward the rear side piece 12 so as to be wrapped around a lower portion of the padding, and the plate-like fastener 19 attached to the free end of the lower side piece 14 is engaged with the fasteners 17a, 17b, 18. In this way, the lower section of the padding is covered with the lower side piece 14 and the fasteners 17a, 17b, 18, 19 are located within the cover 1 so as not to be exposed to the outside.

As discussed above, the cushion according to the present invention ensures that the seat back frame is easily incorporated into the padding and the lower section of padding is easily covered with the lower side piece 14. In addition, the fasteners 17a, 17b, 18, 19 (see FIG. 1) are not exposed to the outside and the zipper strips 15a, 15a', 15b, 15b' are concealed with the covering strips 16a, 16b attached to the both edges of the intermediate piece 13 or the inner edges of the side sections 12b, 12c of the rear side piece 12. Therefore, according to the present invention, it is possible to provide a cushion which has a good visual appearance.

While the above description is made of the cushion for a seat back of a vehicle seat, this invention may be applied to a cushion for a seat cushion of the vehicle seat. The present invention may be also applied to a cushion for an aircraft seat, a cushion for a railroad vehicle seat, a cushion for furniture, or the like.

The terms and expressions which have been employed herein are used as terms of description and not of limitation. There is no intention in the use of such terms and expressions to exclude any equivalents of the features shown and described, or any portion thereof. It is recognized, however, that various modifications are possible within the scope of the invention claimed.

What is claimed is:

1. A cushion for a seat, formed by a die apparatus and comprising a foam padding integral with a three-dimensional cover covering said padding, said three-dimensional cover comprising:
   a first piece;
   a second piece spaced apart from said first piece and facing said first piece;
   said second piece comprising first and second spaced apart sections, and a connecting section adjacent one ends of said first and second sections and interconnecting said first and second spaced apart sections;
   a peripheral piece disposed between said first and second pieces, extending along peripheral edges of said first and second pieces except an edge of one side of each of said first and second pieces, and attached at edges thereof to said peripheral edges of said first and second pieces;
   an intermediate piece attached at an edge of one side thereof to an edge of said connecting section of said second piece between said first and second sections so as to be disposed between said first and second sections;
   a third piece attached at an edge of one side thereof to said edge of said side of said first piece;
   slide fastener means attached to edges of both free sides of said intermediate piece and inner side edges of said first and second sections for coupling and uncoupling said intermediate piece to said first and second sections of said second piece;

said padding being integrated with pieces of said cover except said intermediate piece and said third piece;

first engaging means attached to a free end of said third piece;

second engaging means attached to a free end of said intermediate piece; and third engaging means attached to free ends of said first and second sections of said second piece; wherein said intermediate piece is coupled to said first and second sections of said second piece by said slide fastener means, said second engaging means of said intermediate piece is aligned with said third engaging means of said first and second sections of said second piece, said third piece is extended from said first piece toward said second piece so as to be wrapped around a portion of said padding, and said first engaging means of said third piece is releasably engaged with said second engaging means of said intermediate piece and said third engaging means of said first and second sections of said second piece, so that said padding is covered on all sides with said cover.

2. A cushion for a seat according to claim 1, wherein said padding has a cavity for receiving a support frame for supporting said cushion, said cavity being opened at a side of said padding which faces said second piece.

3. A cushion for a seat according to claim 2, wherein said first engaging means comprises a plate-shaped fastener, and each of said second and third engaging means comprises a fastener of a substantially J-shape in cross-section.

4. A cushion for a seat according to claim 3, wherein said seat comprises a vehicle seat, a seat for an aircraft or a seat for furniture.

5. A cushion for a seat according to claim 2, wherein said seat comprises a vehicle seat, a seat for an aircraft or a seat for furniture.

6. A cushion for a seat according to claim 1, wherein said first engaging means comprises a plate-shaped fastener, and each of said second and third engaging means comprises a fastener of a substantially J-shape in cross-section.

7. A cushion for a seat according to claim 6, wherein said seat comprises a vehicle seat, a seat for an aircraft or a seat for furniture.

8. A cushion for a seat according to claim 1, wherein said seat comprises a vehicle seat, a seat for an aircraft or a seat for furniture.

* * * * *